June 26, 1956   A. W. JACOBSON ET AL   2,752,585
TELEMETRIC APPARATUS
Filed Dec. 11, 1952   2 Sheets-Sheet 1

INVENTORS.
ABRAHAM W. JACOBSON
PASQUALE P. FAMIGLIETTI
BY
E. C. Sanborn
ATTORNEY INVENTORS.
ABRAHAM W. JACOBSON
PASQUALE P. FAMIGLIETTI
BY
E. C. Sanborn
ATTORNEY

United States Patent Office 2,752,585
Patented June 26, 1956

2,752,585

TELEMETRIC APPARATUS

Abraham Walter Jacobson, New Haven, and Pasquale P. Famiglietti, Waterbury, Conn., assignors to The Bristol Company, Waterbury, Conn., a corporation of Connecticut Application December 11, 1952, Serial No. 325,464

17 Claims. (Cl. 340—183)

This invention relates to the multiplexing of telemetering apparatus, and more especially to means whereby a plurality of telemetering receivers of the impulse-duration class may be made responsive respectively to a plurality of corresponding transmitters located at a more or less remote point, and interconnected with said receivers by only a two-conductor circuit. In electrical telemetering over metallic circuits, as in most forms of wire communication, it is highly desirable that maximum use be made of the interconnecting conductors; and it frequently becomes necessary that a single pair of conductors be shared among a number of discrete pairs of transmitters and receivers. Where continuous transmission of the several measurements is essential, various forms of transmission, involving currents and voltages of different frequencies, polarities, phase-positions, etc., may be utilized with more or less satisfactory results; but where the measured quantities do not individually vary at a rate to preclude "sampling," or the intermittent transmission of successive values of the respective measurements, great electrical simplification is obtainable by the use of multiple-point switches at the transmitting and the receiving stations respectively, these being arranged to connect a selected transmitter and its corresponding receiver to the two extremities of the circuit at the same time and for a predetermined period of sufficient duration to enable transmission of a significant measurement, after which that pair of instruments are temporarily disconnected, and another pair inserted in the circuit and rendered operative for a similar interval. This broad idea of "multiplexing" is well known, and for it no invention is herein claimed.

It will be apparent that the effective utilization of multiple point contactors to connect successively a plurality of transmitting instruments to a circuit at one terminal point and a plurality of respectively corresponding receiving instruments at another point demands that the switching operations of the respective contactors be performed substantially simultaneously, and that their operation be maintained in synchronism throughout the whole cycle of operation, and that synchronism be inherently restored after any interruption of the circuit or stoppage of the apparatus, whether said interruption or stoppage be intentional or accidental.

The impulse-duration system of telemetering as used in industry (the so-called "stationary" telemetering), where the durations of the impulses are measured in seconds, lends itself especially well to multiplexing by the use of synchronous contactors, in that the accessory elements necessary to the establishment and maintenance of synchronism between the transmitting and the receiving stations may readily be coordinated with the transmitting and the receiving instruments, thus minimizing the modification from standard telemetering equipment necessary to adapt it to the purpose of multiplexing.

It is an object of the present invention to provide means for successively and selectively connecting individual sets of telemetering transmitters and receivers to a common two-conductor circuit.

It is a further object to provide means of the above nature which shall be rapid in its switching operation and positive in synchronization of contactors at the transmitting and the receiving stations respectively.

It is a further object to provide means of the above nature wherein synchronism shall be automatically established upon starting up the apparatus and automatically restored after any interruption of electric service.

It is a further object to provide means of the above nature which shall be applicable in principle to either a group of individual receiving instruments associated with respectively corresponding transmitters, or to a multiple-point recorder wherein records of the measurements performed by the respective transmitters are successively made upon a common chart.

It is a further object to provide a multiplexed telemetering system wherein all transmitted electrical signals—those corresponding to quantitative measurements to be transmitted, and those for the purpose of establishing and maintaining synchronism between stations—shall be of a single electrical nature, without need for polarization, and therefore suited to transmission over a single channel of communication.

It is a further object to provide means of the above nature which shall be adaptable to use with metallic circuits, or with any of the systems of "phantom" circuits known in the art of electrical communication, or with carrier-current, or with microwave equipment.

It is a further object to provide a multiple-point telemetering system having dial switches corresponding to the several measuring points of said system, and wherein the switch points through which circuit selection is effected shall have their function restricted to said selection without being required to make or to break any electric current.

It is a further object to provide means of the above nature which may readily be incorporated in standard equipment, and which may be constructed with a minimum of specially designed components.

In carrying out the purposes of the invention, it is proposed to provide at the transmitting terminal point of a two-conductor circuit a multiple-point contacting device and to provide at the receiving terminal a multiple-point recording device, which latter may be incorporated in a group of individual receiving instruments, or in a single multiple-point recorder, as the case may be, and to include in said contacting device a single contact interposed between two of those associated with individual transmitters, whereby for purposes of synchronization to utilize an electrical signal or impulse of duration differing from that of any of the impulses developed by the transmitter and corresponding to the magnitude of a measured variable. The synchronizing signal does not differ in nature or polarity, but only in duration, from the signals corresponding to the measuring impulses. For example, if the system be of the class utilizing direct-current signals as a transmitting medium, the synchronizing signal will also be direct current, and of the same voltage and polarity as the measuring signal, differing therefrom only in duration.

Figure 1:
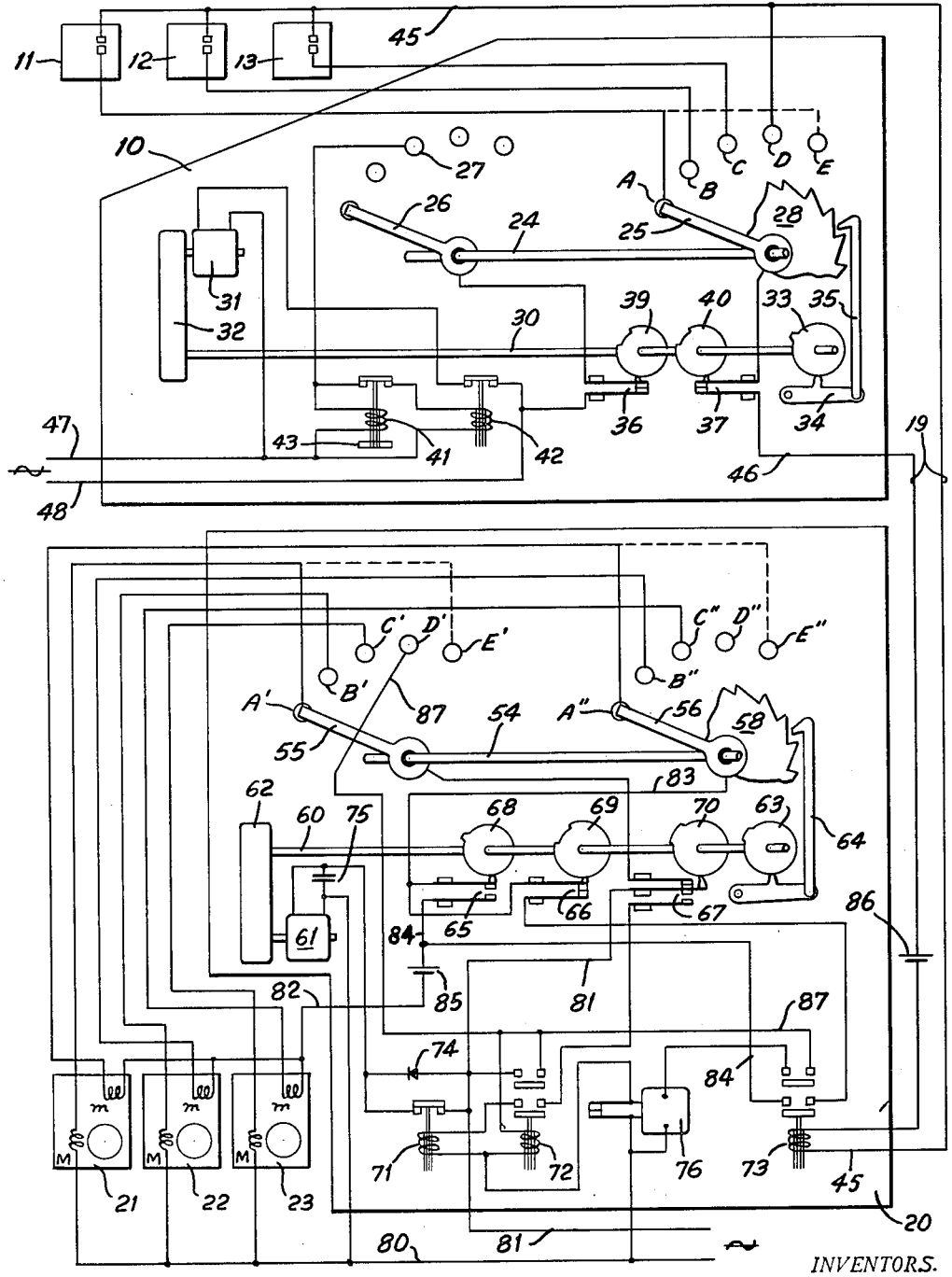
Fig. 1 is a diagrammatic representation of a multiplex telemetering system incorporating the principles of the invention and adapted to provide on a plurality of recording instruments measurements performed by a plurality of corresponding remotely located transmitting instruments.

Referring now to the drawings: In Fig. 1 the numeral 10 designates a transmitting terminal unit adapted to receive signals from an adjacent group of telemetric transmitters 11, 12, 13, of the impulse duration class, and selectively and sequentially to impress said signals upon a two-wire interconnecting circuit 19 by which they are transmitted to a receiving terminal unit 20. The receiving terminal unit 20, operating in timed relation with the unit 10, distributes the signals arriving over the circuit 19 to receiving instruments 21, 22 and 23, corresponding respectively to the transmitters 11, 12 and 13, whereby each receiving instrument is made responsive to, and only to, the corresponding transmitting instrument.

For purposes of simplicty, there are shown only three transmitting and three receiving instruments, but it will be understood that a larger number may be used; and while a practical design is based on the use of fifteen pairs of instruments, this is in no way indicative of the limitations of the method. Each of the transmitters 11, 12, etc. is of the class wherein by means of intermittently operated contacts there are established cyclically recurring electrical signals, of which the duration of each signal in its cycle is representative of the then value of the quantity under measurement. Such a transmitter is fully set forth and disclosed in U. S. Letters Patent No. 2,214,159 granted to F. B. Bristol, September 10, 1940. Each of the receivers 21, 22, etc. is of a class adapted to receive signals originating in said transmitters and to translate them into proportional displacements of a movable member, capable of being visually observed or permanently recorded on a graphic chart. Such a receiver is set forth and disclosed in U. S. Letters Patent No. 2,040,918 granted to C. W. Bristol, May 19, 1936.

It may here be observed that in telemetric receiving instruments of the impulse-duration class, as shown in said C. W. Bristol patent, the pointer positioning mechanism is at all times active, there being two oppositely disposed impellers or dogs, one adapted to excurse from the zero point of the scale in an upward direction and the other to excurse from the top of the scale in a downward direction. According to whether the associated electromagnet is energized or de-energized, one or the other of these dogs will be in motion, the other being reset to its starting point immediately upon termination of its excursion. Thus, if the electromagnet becomes de-energized, or remains in an energized condition, other than in response to a signal developed in the transmitter, the corresponding dog will assume a position having no true significance, and a false reading may be obtained. It is essential, therefore, that, upon de-energization of any of the electromagnets in the receivers from a cause other than a transmitter signal, the receiver motor mechanism likewise be brought to rest until the magnet is again made subject to cyclical impulses derived from a transmitting instrument. Furthermore, if the motor be brought to rest when the electromagnet is in a de-energized condition, the dog or impeller at that time active will remain in its deflected position until the magnet is re-energized to release it. Resumption of operation after advance of the dial switches or after a power interruption might thus be temporarily productive of a false reading (which would be corrected in the succeeding cycle of transmitter performance). This source of possible error, however, may be eliminated by momentarily energizing the electromagnet at any time the motor is shut down.

For purposes of simplicity in disclosure, and because the essential elements of both the transmitters and the receivers are fully described in the above mentioned patents, these instruments are here shown in their most elementary representation. Only the signal transmitting contacts of the transmitters 11, 12 and 13 appear in the diagram, while in the receivers 21, 22 and 23 only the motors (designated "M") and the clutch magnet windings (designated "$m$") are shown. Thus, mention of winding "22M" in the subsequent description refers to the motor of receiver 22, or "23$m$" to the magnet winding of the receiver 23.

The transmitting terminal unit 10 and the receiving terminal unit 20 include each a motor-driven multiple-point switching mechanism essentially similar in its mechanical features to that set forth and described in copending application Serial No. 44,625, filed by C. A. Blakeslee, August 17, 1948, now Patent Number 2,628,-149. This mechanism comprises a double-arm dial switch intermittently advanced through a ratchet or its equivalent from a continuously rotating shaft which carries cam members for periodically actuating contactors hereinafter to be more fully described. The arrangement of the ratchet or equivalent mechanism will be governed by the number of contact points on the dial switch, and thus by the number of revolutions of the cam-shaft corresponding to a complete cycle of the switching apparatus. A more or less standard design, well adapted to the purposes of the present invention comprises a dial switch having sixteen distinct positions, which as herein adapted will provide for as many as fifteen discrete telemetering sets, leaving one point on the dial switch for the purpose of establishing synchronism between the transmitting and the receiving units as hereinafter to be set forth.

The transmitting terminal unit 10 will now be described in detail. Suitably journaled in said unit is a shaft or rotatable member 24 carrying two electrically independent contact arms 25 and 26, adapted to be moved integrally with said member 24, and to make electrical engagement successively with points on two corresponding circles of contact studs. While, as hereinbefore set forth, each contact circle in the conventional embodiment of the apparatuses provided with sixteen points, the drawings, in the interest of simplicity, show only five of these, as being sufficient to make clear the principles of the invention. The contact points on the ring corresponding to the arm 25 are designated by A, B, C, D and E. As used for the purposes of the illustrated embodiment, only one of the studs on the circle engaged by the arm 26 is utilized, the remainder being left un-connected. That one stud, selected to represent the last point in the operating cycle before synchronization is effected, is designated by the numeral 27, and is the stud engaged by the arm 26 at the same time as the arm 25 is in electrical engagement with the stud C.

The rotatable member 24 is provided with a ratchet member 28 (of which only a sector is shown in the drawing) having a number of teeth to correspond to the number of studs on the multiple-point switch—in the present instance, sixteen. Suitably journaled in the unit 10 is a cam-shift member 30 adapted to be driven by a constant-speed electric motor 31 through a suitable gear reduction 32 whereby to obtain an angular velocity corresponding to the frequency with which it is desired that individual measurements be performed and selection made of successive sets of telemetering instruments. As an example of a suitable operating velocity, a speed of the order of five revolutions per minute may be named, thus providing for a measuring interval of 12 seconds on each point of the dial-switch. The shaft member 30 is provided with a cam member 33 adapted to act upon a follower 34 to operate a pawl member 35 engaging the periphery of the ratchet 28, whereby to advance the latter one tooth, and with it the contact arms 25 and 26 one contact space on the respective dial switches, with each revolution of said shaft member 30. The design of the intermittent motion member is made such that the advancing of the dial switches will occupy but a small part—preferably not over one-twelfth—of the time interval represented by a single revolution of the shaft 30.

Juxtaposed to the shaft 30 are two normally closed snap-action contactors or switches 36 and 37, adapted for actuation respectively by cams 39 and 40 carried by said shaft and conformed to operate said switches in a manner presently to be described. Included in the unit 10 are two single-pole relays 41 and 42 having normally closed contacts, the former relay being provided with a dashpot, lagging coil, or equivalent time-delay element 43, whereby opening of its contacts will not be completed until several seconds after its actuating winding is energized.

The electrical connections of the transmitting terminal unit 10 are as follows: One side of each of the contacts in the transmitting instruments 11, 12, etc., is connected to a common conductor 45, to which also is connected the stud D of the dial switch comprising the contact arm 25. The free sides of the contacts in the instruments 11, 12 and 13 are connected respectively to the studs A, B and C of said dial switch. With a greater number of transmitting instruments, the free contacts would be connected to the studs E, etc., progressing around the dial switch toward the starting point A; but if the installation includes only three transmitters, contact points A and E would be interconnected, as indicated by the conductor shown dotted, and a similar system will be employed in order to make use of all the studs on the dial switch. The contact arm 25 is electrically connected to one side of the cam-actuated contactor 37, and to the other side of said contactor is connected a conductor 46, which, with the conductor 45, comprises the two-wire circuit 19 through which measuring signals are transmitted to the receiving terminal unit 20 and its associated receiving instruments. Two conductors 47 and 48 constitute the sides of a power circuit, preferably, though not necessarily, alternating-current. To the conductor 47 are connected one terminal each of the actuating windings of the relays 41 and 42 and also one side of the winding of the motor 31. The free terminal of the actuating winding, and also one side of the contact, of the relay 41 are connected to the stud 27 on the dial switch of which the arm 26 forms a part; and the other side of the contact of relay 41 is connected to the free terminal of the operating winding of relay 42, whose contacts are connected in series between the free terminal of the motor 31 and the conductor 48. The contacts of snap-action switch 36 are connected in series between arm 26 and conductor 48.

The receiving terminal unit 20 includes a multiple-point switching device substantially identical in its mechanical embodiment to that in the transmitting terminal unit 10. A rotatable member 54 carries two insulated contact arms 55 and 56 movable integrally therewith and adapted respectively to engage two circles of contact studs, those coacting with the arm 55 being designated respectively A', B', C', D' and E', and those coacting with the arm 56 designated A", B", C", D" and E". It will be understood that the studs A' and A" are engaged by their respectively associated contact arms 55 and 56 at the same time, and so for all other points comprising the two dial switches in the receiving terminal unit.

The rotatable member 54 is provided with a ratchet 58 having teeth to correspond to the respective studs on the dial switches; and a cam-shaft member 60 adapted to be driven by an electric motor 61 through a gear reduction 62 at a speed identical with that of the shaft 30 in the unit 10, carries a cam or equivalent 63 to operate a pawl member 64 engaging the ratchet 58 to advance the latter, and with it the contact arms 55 and 56 by increments of one space on the associated dial switches with each revolution of said shaft member. It will be understood that corresponding dial switches in the transmitting and receiving units respectively are identical in structure and in the numbers of contact studs, and that similarly the ratchets in the two units have identical numbers of teeth.

Juxtaposed to the shaft 60 are three snap-action contactors 65, 66 and 67 adapted for actuation respectively by cams 68, 69 and 70 carried by said shaft. The contactor 65 is normally open, the contactor 66 is normally closed, and the contactor 67 is of the single-pole double-throw class, having two contact members of which one is normally out of, and the other is normally in, electrical engagement with a common contact member movable by the cam member 70. Included in the receiver terminal unit 20 are three relays 71, 72 and 73, of which the first is provided with single-pole normally closed contacts and the other two are of the double-pole normally open form. Where the motor 61 is of the alternating-current type a diode rectifier 74 is connected across the contacts of relay 71 and a capacitor 75 across the terminals of the motor. Also included in the unit 20 is a motor-driven time-delay switch 76 having a motor element and a pair of contacts normally closed and adapted to be opened by said motor element a predetermined and adjustable time interval subsequent to energization of the motor. A characteristic of this device is that when the motor is deenergized the contact-actuating member is quickly reset to zero by means of a spring. Thus the timing is not cumulative, and the contacts will not be opened unless the motor has been continuously energized for the adjusted time interval, which is made to be longer than the maximum time of any possible signal originating in the telemetering transmitters with which the apparatus is to be used. Timing devices of this nature are well known in the art, and are readily available from commercial sources. As examples, there may be named the Cramer and the Haydon timers, of which, among others, descriptions will be found in the article "Electrical timing devices" by F. E. Reeves, in "Electrical Manufacturing," September 1948, page 114.

The electrical connections of the receiving unit 20 are as follows: One terminal of each of the motor windings M in the receiving instruments is connected to a common conductor 80. The free terminals of said motor windings are connected respectively to the dial-switch studs as follows: 21M to A', 22M to B', and 23M to C'. The rotatable contact arm 55 which successively engages said studs is connected to the normally closed contact of switch 67 to whose common contact is connected a conductor 81. The conductors 80 and 81 are connected to a source of electric power of a nature suited to operation of the motors in the receiving instruments, said source being here illustrated as supplying alternating current.

One terminal of each of the magnet windings $m$ in the receiving instrument is connected to a common conductor 82. The free terminals of said magnet windings are connected respectively to the dial switch studs as follows: 21$m$ to A", 22$m$ to B" and 23$m$ to C". The contact arm 56 which successively engages said studs is connected by means of a common conductor 83 to one terminal of each of the contactors 65 and 66. As pointed out in describing the transmitting terminal unit 10, further connections between the elements of the individual instruments and the studs on the dial switches will be governed by the number of sets of telemetering instruments in the installation. If, for example, only three receivers are included, contact points A' and E', and points A" and E", respectively, would be interconnected, as shown dotted, and similarly around the circle of contact studs.

The free terminal of the contactor 65 is connected by means of a conductor 84 to one side of a battery 85 or equivalent source of power suited to operation of the magnets $m$, and to the other side of said source is connected the conductor 82 common to said electromagnets.

The actuating winding of the relay 73 is connected, in series with a battery 86 (or equivalent source of power suited to the operation of said relay) to the conductors 45 and 46 which together form the two-wire circuit 19 interconnecting the transmitting and receiving terminal units. One set of the normally-open contacts of said relay (which may be referred to as the main contacts) is connected in series between the conductor 84 and the free terminal of the normally closed cam-actuated contactor 66. The other set (which may be referred to as the auxiliary contacts) of the relay 73 is connected in series between one terminal of the operating winding of the time delay switch 76 and a conductor 87 which in turn is connected to the dial switch stud D'. The free terminal of the operating winding in time-delay switch 76, together with one of the contact members thereof, is connected to the line conductor 80. The other of said contact members in the time-delay switch is connected to a common terminal of the operating windings of the relays 71 and 72. The free terminal of the actuating winding of relay 72 is connected to the conductor 87, and one set of the normally-open contacts of said relay is in series between said conductor 87 and the line conductor 81. The normally-open contact of the cam-actuated switch 67 is connected in series with the other set of contacts in the relay 72 to the free terminal of the actuating winding of the relay 71. The normally-closed contacts of the relay 71 (bridged by the rectifier 74) are connected in series between the free terminal of the motor 61 and the line conductor 81.

Figure 2:
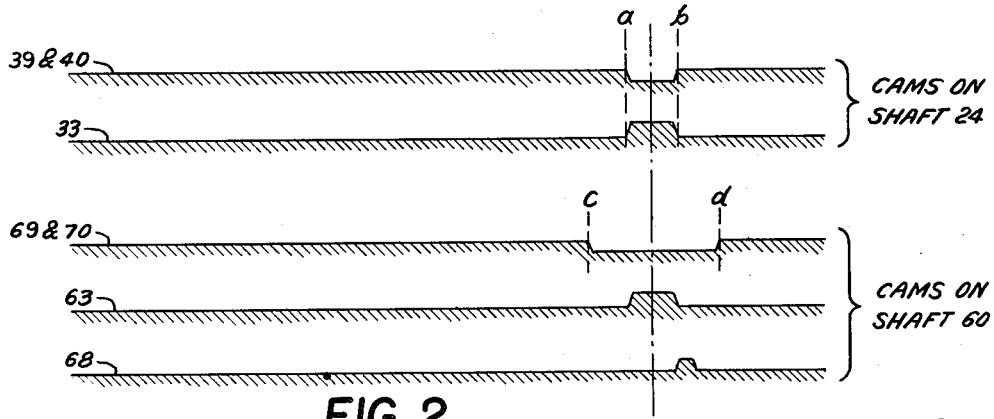
Fig. 2 is a graphic representation of the relative positions of cam members located respectively at the transmitting and the receiving terminals of the system shown in Fig. 1.

The conformations of the several contact-actuating cams in the transmitting unit and in the receiving unit, in their relationship to each other and to the dial switches, are shown in Fig. 2. Cams 39 and 40 which actuate the switches 36 and 37 respectively may be of identical contour. In fact, these switches may be actuated by a single cam, the requirement being that both switches open their contacts immediately prior to the action of the ratchet or equivalent mechanism which advances the contact arms of the dial switches, and reclose their contacts after said arms have come to rest.

The cams 69 and 70 in the receiving terminal unit 20, like the cams 39 and 40 in the transmitting terminal unit, are preferably designed to operate their respective followers simultaneously, and, by suitable modification, as will be understood by those versed in the art, may be replaced by a single cam. Referring to Fig. 2, it will be noted that portion $a$—$b$ of the transmitter cam assembly representing the time interval when the switches 36 and 37 are in their open-circuit positions, is shorter than the corresponding portion $c$—$d$ of the receiver cam assembly, corresponding to the interval when the switch 66 is open and the double throw switch 67 is in a position to bring the conductor 81 into engagement with the contact system of relay 72, instead of with the dial-switch contact arm 55. In other words, the dwell of the cams 39 and 40 establishes a time interval normally lying wholly within that established by the dwell of the cams 69 and 70; and under ideal operating conditions, as indicated, the respective cam followers will concurrently lie at the middle points of the dwells of their associated cams. The invention includes means tending to establish and maintain this condition, whatever causes for deviation may be encountered.

Because the snap-action switches 66 and 67 are in the D.-C. magnet and the A.-C. motor circuits respectively of the receiving instruments, it may, as hereinafter pointed out, be desirable they operate sequentially rather than simultaneously. Commercial forms of these switches are adjustable to vary the instant of operation in relation to the position of the actuating member. Thus there is available a considerable choice of switching time without adjustment of the controlling cam.

The cam 68, which may be referred to as the "pulsing" cam, is provided with a single tooth or lobe, whereby momentarily to close the contacts of the switch 65 once in each revolution of the shaft 60, and at an instant slightly later than the middle of the interval established by the cams 69 and 70.

Consideration may now be given to performance of the apparatus as thus far described. Alternating voltage being applied between the conductors 47 and 48 in the transmitting unit, and the contact-arm 26 being in its position shown and out of engagement with any connected contact point of the associated dial switch, relays 41 and 42 will remain de-energized, with their respective contacts closed, and through the contacts of the latter relay the motor 31 will be energized for continuous operation.

Alternating voltage being applied between the conductors 80 and 81 in the receiving unit, and the relay 71 being de-energized, as indicated in the drawing, said voltage will be impressed upon the terminals of the motor 61, causing the latter to operate. The capacitor 75 connected across the terminals of said motor constitutes a parallel load at all times the motor is operating, and performs no function except when said motor is brought to rest, as hereinafter to be explained.

It may be assumed that the three transmitting instruments 11, 12 and 13 are measuring independently variable quantities and actuating their contact members to define cyclically recurrent electrical signals of durations representing the values of the respective measured variables at the intervals of measurement, and that it is desired to exhibit on the corresponding receiving instruments 21, 22 and 23 independent representations of said quantities. Assume first that the snap-action switches, the relays and the dial switches are in the positions shown in the drawing, the contact arms of the latter switches being in electrical engagement with the studs A, A' and A" respectively, whereby to connect the transmitter 11 and the corresponding receiver 21 into the measuring system. It will be seen that through the contact arm 25 connection is made from the contacts of the transmitter 11 directly to the circuit 19, and thence to the receiving terminal unit 20, so that the relay 73 will be energized and de-energized from the source 86, with the closing and opening respectively of the contacts in the instrument 11. Connection will thus be intermittently made from one terminal of the source 85 through conductor 84, the contacts of relay 73, the contacts of switch 66, conductor 83, contact arm 56 and stud A" to one terminal of magnet 21m, and thence, by the common conductor 82, to the other side of the source 85. The magnet 21m will thus be energized and de-energized in response to signals originating in the contacts of transmitter 11. At the same time, as long as contact arm 55 engages stud A' and switch 67 is in the position shown, current flows from conductor 81 through the closed contacts of switch 67, contact arm 55, stud A' and the winding of motor 21M, to conductor 80, energizing said motor for operation, and rendering the receiving instrument 21 effective to provide an indication or record of measurements performed at the transmitting instrument 11. As no contact studs other than A, A' and A" in the dial switches are engaged by their respectively associated contact arms, the contacts in the transmitters 12 and 13 will not define any electrical signals, and the motors and the magnets of receivers 22 and 23 will remain de-energized. While the auxiliary contacts of the relay 73 are closed and opened with each operation of said relay, so long as the contact arm 55 does not engage the stud D' these contacts cannot complete any circuit, and consequently the relays 71 and 72, as well as the motor-time-delay relay 76, remain inert.

It may now be assumed that the elements of the transmitting terminal unit 10 and the receiving terminal unit 20 have remained in the positions shown for a sufficiently long time to permit proper positioning of the indicating or recording member in the instrument 21, when in its normal rotation, the shifting cam 33 on the shaft 30 in the transmitting terminal unit and the corresponding cam 63 on the shaft 60 in the receiving terminal unit, will reach the positions where they are about to advance their respectively associated contact-arm assemblies to the next studs in order on the contact circles. At this position, corresponding to the point $c$ on the receiver cams 69 and 70 (see Fig. 2), said cams will become effective, the former to open the contacts of switch 66 and the latter to actuate switch 67 to interrupt connection between the contact arm 55 and the line conductor 81 and at the same time to connect the latter conductor to a contact of relay 72. Opening of the contacts of switch 66 interrupts the normal operating circuit from the main contacts of relay 73 to the contact arm 56, de-energizing the electromagnet 21m, without respect to the position of relay 73. In a similar manner, opening of the normally closed contacts of the switch 67 will de-energize the motor 21M, bringing the whole mechanism of the receiving instrument 21 to rest. As previously pointed out, the snap-action switches 66 and 67 may be adjusted to operate sequentially. Thus, the switch 67 may be caused to interrupt the circuit of the receiver motor slightly in advance of the time the switch 66 opens that of the magnet. In this manner, allowance is made for possible "coasting" of the motor, with consequent assurance that it will come to rest before the magnet becomes non-responsive to signals from the transmitter. This renders it impossible for the receiving instrument to assume a false indication due to operation of its electromagnet other than by a signal originating in the transmitting instrument.

Shortly after the receiving instrument has been cleared from operation as described, the cam-followers of the cams 39 and 40 will have reached the point a, as shown in Fig. 2, opening the snap-action switches 36 and 37 respectively. As the contact-arm 26 is engaging a blank stud on the dial-switch the former snap-action switch performs no function, but the latter is effective to relieve the contact-arm 25 of the possibility of having to break the signal current in the event the contacts of the transmitting instrument should be closed as said contact-arm is advanced from one stud to the next in order.

During the interval while the circuits to the several contact arms in the transmitting and receiving instruments are maintained in an open condition by the respectively associated snap-action switches, the ratchets 28 and 58 will be operated by the pawls 35 and 64, actuated by cams 33 and 63 respectively, and the contact arms 25 and 26 in the transmitter and 55 and 56 in the receiver will be quickly advanced and then brought to rest, with the arm 25 on the stud B, the arm 55 on the stud B′ and the arm 56 on the stud B″.

As the ratchet mechanism comes to rest, the "pulsing" cam 68 in the receiving terminal unit will cause the contacts of switch 65 to be closed and opened, thus momentarily energizing the electromagnet 22m from the source 85 through the contact arm 56 and the stud B″ with which the latter is now in engagement. This momentary action of the magnet in the receiver, as previously pointed out, serves to release the associated impeller or dog, allowing same (if at any other position) to reset to zero and prevent possible erroneous readings due to cumulative deflection based on previous advance of that element in an un-completed cycle.

With advance of the cams 39 and 40 in the transmitting terminal unit to a point corresponding to b in the diagram, the switches 36 and 37 will be closed; and while the former, being in an otherwise incomplete circuit, will perform no function, the latter will re-establish the main signal circuit 19, including therein the contacts of the transmitting instrument 12, through the stud B engaged by the contact-arm 25. Shortly thereafter under normal conditions, at a point corresponding to d in the diagram, the cams 69 and 70 will cause the switches 66 and 67 to close their contacts in circuit with the respective contact arms 56 and 55, whereupon, with the receiver motor 22M in circuit through the dial switch stud B′ and the magnet 22m through the stud B″, the receiving instrument 22 will be rendered responsive to the relay 73 to provide an indication or a record, as the case may be, of measurements corresponding to cyclically timed signals originating in the transmitter 12.

Upon completion of the measuring period, as established by the rotation of the cam shafts 30 and 60, the cam-actuated switches in the transmitting and receiving terminal units respectively will modify the arrangement of the several circuits as hereinbefore set forth, and the ratchet mechanisms will become operative to advance the contact arms to positions where the studs C, C′ and C″ are respectively engaged thereby. At the same time, the arm 26 in the transmitting unit will engage the stud 27, which has been selected as corresponding to the last switching position before synchronization takes place, and which, as hereinbefore pointed out, is the only stud in its circle to be connected to the electrical circuits. As engagement of the arm 26 with the stud 27 takes place, however, at a time when the cam-actuated switch 36 is open, the circuit controlled thereby remains incomplete, and said engagement initiates no immediate effect. With further advance of the cams 39 and 40, the switches 36 and 37 in the transmitting unit will be closed; and shortly thereafter, cams 69 and 70, acting through the switches 66 and 67, will complete the telemetering circuits, whereby to render the receiving instrument 23 responsive to the transmitting instrument 13 to provide an indication or a record of measurements performed by the latter.

Closing of the contacts of switch 36 in the transmitting unit now serves to complete a circuit from the conductor 47 through the actuating windings of the relays 41 and 42 (the latter including in series the contacts of relay 41) the stud 27 and the contact arm 26, to the conductor 48, thereby energizing both said relays for operation. Relay 42 will operate substantially instantaneously, opening its normally closed contacts, interrupting the circuit of the motor 31 and bringing the latter, together with the shaft 30 and attached cams, to rest. A short time later, as determined by the setting of the time-delay relay 41, the contacts of the latter will be opened, de-energizing the relay 42, closing its contacts, and re-establishing operation of the motor 31 and the cam mechanism driven thereby. This momentary interruption serves to introduce a lag of several seconds in the operation of the transmitting terminal unit as compared with that of the receiving terminal unit; and the purpose of such delay will hereinafter be made clear.

Upon completion of the measuring period wherein the transmitter 13 and the receiver 23 are in operative coaction, the synchronizing period is introduced, and the transmitting and receiving switching mechanisms are brought to the synchronizing position. While the several cam-actuated switches in the transmitting and the receiving terminal units will be operated as before, the previous interruption in operation of the motor 31 will cause the contact-arms 25 and 26 to lag behind the corresponding elements of the receiving terminal unit. Thus, the latter unit will have completed its advance, will have brought its contact-arms 55 and 56 to rest on studs D′ and D″ respectively, and will have re-closed the normally-closed contacts of switch 67, before the arm 25 in the transmitter unit is brought into engagement with the stud D. As the arm 55 in the receiver unit comes to rest on the stud D′ and the normally-closed contacts of the switch 67 are reclosed, there is provided, through said arm, stud, and contacts, a connection between the conductor 87 and the line conductor 81. The relay 72 is thereby immediately energized, closing its two sets of normally-open contacts, one set of which provides a circuit for locking said relay in its energized position, though the circuit should be opened at the switch 67, and also for energizing the motor of time-delay switch 76 through a circuit subsequently to be completed by the contacts of relay 73. The other set of contacts in the relay 72 provides an electrical connection between the free terminal of the winding of relay 71 and the normally-open contact of snap-action switch 67. With the contact-arms 55 and 56 resting on studs D′ and D″ respectively, no telemetering receivers are operative.

The cam-shaft 60 in the receiving terminal unit will continue to rotate until a position is attained corresponding to the termination of the normal measuring period, when the switch 67 is actuated to open its normally-closed, and close its normally-open contacts. The relay 72, originally energized through the first-named of said contacts, being locked in through its own contacts, will remain in its energized position. Through the now closed contacts of switch 67 there will be completed a circuit from the conductor 81, the contacts of relay 72, the winding of relay 71, the contacts of time-delay switch 76 to the conductor 80. This circuit will energize the relay 71, causing the same to open its normally-closed contacts and interrupt the supply of alternating current to the motor 61. The rectifier 74 bridged across the contacts of relay 71 allows a unidirectional component of current to flow in the winding of motor 61, while the capacitor 75 in parallel with the motor circuit, being of suitably selected value, eliminates from said circuit sufficient of the residual alternating component passing through the rectifier, that, according to well known principles in the operation of alternating-current motors, the D.-C. component will provide a powerful braking action and bring the motor abruptly to rest without appreciable coasting. It will be understood that if the installation is of the direct-current class, with the motor 61 adapted to D.-C. operation, it will be necessary in order to obtain the desired abrupt stoppage characteristic that use be made of dynamic braking or some other expedient well known in the art in order to bring the mechanism to rest at the desired point in the cycle of operation. In any event, the mechanism of the receiving unit is brought to rest in the position where it is about to advance from the synchronizing point to the next measuring point on the dial-switch.

Immediately after the contact-arm 25 in the transmitting terminal unit comes to rest on the stud D the switch 37 will be closed, completing the circuit through the interconnecting line 19 by means of the contact-arm 25 and the stud D, to energize the relay 73 in the receiving terminal unit; and, because of the interconnection of the conductors 87 and 81, the time-delay switch 76 will be energized for operation.

As the time-delay switch 76 completes its cycle, it opens its contacts, de-energizing the relays 71 and 72, restarting the motor 61, and causing the associated circuits to revert to their normal condition. Release of the relay 72 will disconnect the conductor 87 from the line conductor 81, thereby de-energizing the motor of the time-delay switch 76, whereupon the latter will reset to its normal position of rest. The time setting of the switch 76 is made such that upon its opening its contacts and allowing the motor 61 to re-start, the contact-arm-advancing mechanism in the receiving unit will be actuated to advance the arms 55 and 56 to the studs E' and E'' respectively at the same instant as the corresponding mechanism in the transmitting terminal unit is advancing the arm 25 away from the stud D to the stud E. The selector switches in the transmitting and the receiving terminal units respectively will thus continue to advance from position to position until the complete circles of contact points have been engaged by the corresponding contact arms, thus establishing repetitive cycles of operation, including in each cycle a position where synchronism between said terminal units is automatically checked and established.

The preceding description of the operating performance of the apparatus is based on normal conditions, wherein there has been no cause for disturbance of synchronism between the transmitting and the receiving units. Such operation is manifested in the relative position of the transmitting unit shaft 30 and the receiving unit shaft 60 being maintained such that the space $a$—$b$ defined by the cams 39—40 in the transmitting terminal unit (as shown in Fig. 2) is maintained within the broader space $c$—$d$ defined by the cams 69—70 in the receiving terminal unit.

If the mean velocities of the mechanisms in the transmitting and the receiving terminal units are not identical, as may be the case in the event of the motors 31 and 61 being energized from mutually independent A.-C. power sources of slightly different frequencies, and if the algebraic sign of the speed discrepancy be sustained, there will be a cumulative time error between switching operations of the transmitting-end and the receiving-end mechanisms. If the instantaneous relative positions of the cams exceed the limits indicated in Fig. 2 malfunctioning will occur. The delay introduced in the transmitting unit immediately before the synchronizing position is reached simulates the effect of a consistently lower frequency at the transmitting end of the system; and this delay is made such that under any normal frequency relationship between the power supplies at the two stations, the receiving unit dial switch will always reach the synchronizing position before the transmitting unit dial switch, and will require to wait for the same. Thus, in order for the system to fall out of synchronism it would be necessary for the maximum allowable time error due to frequency discrepancy to be attained in a single cycle of scanning.

From the foregoing discussion of the apparatus there will have become apparent the following enumerated characteristics:

(1) The interconnecting or signal line between the transmitting and receiving stations is always open circuited at the time the transmitting unit dial-switch is being advanced.

(2) The motor and magnet circuits in the receiving instruments are always open at the time the receiving unit dial switch is being advanced.

(3) After each advance of the dial switch, and prior to completion of the telemetering circuits, the electromagnet of the incoming receiver receives a momentary impulse to reset the impeller to zero.

(4) During the last position in the cycle, immediately before the synchronizing position is attained, the transmitting unit motor is subjected to a slight delay in operation. This delay is made such that under any normal frequency relationship between the power supplies of the transmitting and the receiving terminal units respectively, the receiving unit dial switch will always reach the synchronizing position before the transmitting unit dial switch, and will require to wait for the latter.

(5) Since the transmitting dial-switch will lag behind the receiving dial-switch in attaining the synchronizing position, it will always be necessary in order to restore synchronism that the latter dial-switch experience a lag at some point in its cycle.

(6) As the receiving terminal unit is ready to leave the synchronizing position its driving motor is stopped and the mechanism brought to rest.

(7) As the transmitting unit reaches synchronizing position, the time-delay switch in the receiving unit is started and the preset interval initiated.

(8) When the time-delay switch completes its preset interval, the receiving unit motor is re-started.

(9) The setting of the time-delay switch is made such that the receiving unit motor will be re-started and will advance the receiver dial switch at the same instant in the operating cycle as the dial switch in the now steadily running transmitting unit is advanced.

(10) If the receiving terminal unit should reach the synchronizing position while the contact arm 25 in the transmitting terminal unit is at any non-corresponding point on the contact circle, the relay 73 in the receiving unit will respond to signals from the connected transmitting instrument, and will repeatedly energize and de-energize the motor of the time-delay switch 76. However, since the time setting of this device is made greater than any possible signal originating in a transmitting instrument, and since it resets to its starting point with each interruption of applied voltage, its contacts will not be opened, and the relays 71 and 72 will continue to be energized and the motor 61 will remain at rest. The receiving instruments will remain inactive, and the receiving terminal unit will continue to wait until the transmitting terminal unit attains the synchronizing position and the interconnecting circuit 19 is closed through the arm 25 and the contact stud D, at which time the relay 73 will be energized for a time interval not subject to interruption by the contacts of any of the transmitting instruments, and hence of greater duration than the time setting of the relay 76.

(11) If the transmitting terminal unit reaches the synchronizing position while the receiving unit is at any other point, the relay 73 in the latter unit will receive a signal of long duration, and the active receiving instrument will run to the end of its scale, or as far as it may before the contact 37 in the transmitting unit is opened preparatory to moving on to the next point. The units will remain out of synchronism for the remainder of the operating cycle, i. e., until the receiving terminal unit reaches the synchronizing position, whereupon (as in 10, above) it will wait until the transmitting unit also has reached that position, at which time synchronism will be re-established.

It has been pointed out that a mechanical embodiment of apparatus eminently suited to the purposes of the invention is found in the multiple-recording device set forth in Blakeslee application Serial No. 44,625. When it is desired that the telemetered measurements be exhibited on separate receiving instruments, as shown in Fig. 1, said device is modified to the extent hereinbefore described and adapted to the purposes of a receiving terminal unit, whereby incoming signals are switched in proper time relation to the proper individual receiving instruments. It will be apparent, however, that since the said Blakeslee apparatus is primarily intended for the purpose of presenting on a single chart a plurality of records representing separately determined quantities, its adaptation to the joint purpose of multiple recording and synchronization in a single unit will be characterized by greater simplicity than the hereinbefore described combination of a synchronizing receiving terminal unit with a plurality of individual exhibiting instruments.

Figure 3:
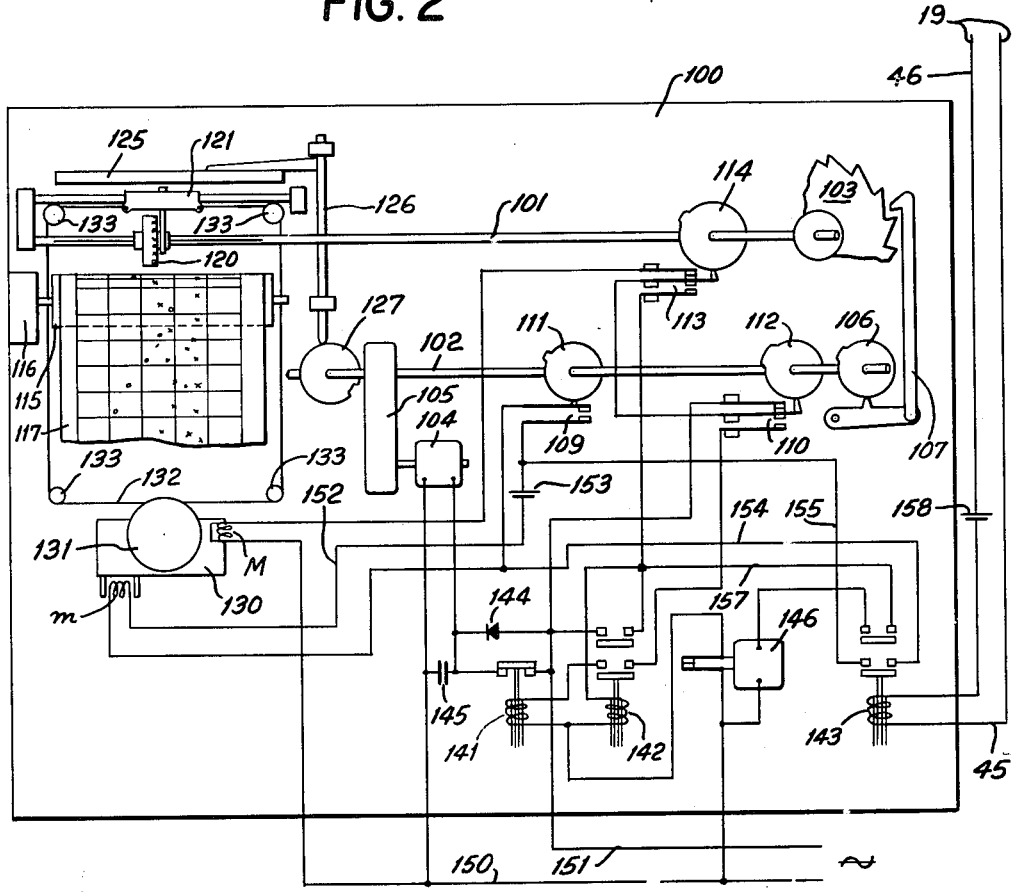
Fig. 3 is a diagram of a receiving device alternative to that shown in Fig. 1, and adapted to produce on a single chart a plurality of discrete records representing measurements performed by a plurality of corresponding remotely located transmitting instruments.

In Fig. 3 is shown receiving apparatus adapted to use alternatively with the unit 20 of Fig. 1 and dependent recorders, and comprising in a common assembly a single impulse-receiving mechanism and means for establishing and maintaining synchronism between it and the transmitting terminal unit 10, together with recording means whereby readings corresponding to the several transmitters are inscribed on a common chart and at the same time segregated for identification with individual measurements performed at the transmitting stations.

As hereinbefore stated, the multiple-point recorder may be similar to that set forth in said Blakeslee application Serial No. 44,625 with modifications as hereinafter to be described.

While in the interest of simplicity the impulse-receiving mechanism and the recording device are shown as interconnected by mechanical means of a most elementary nature, the interconnection in practice may comprise an electrical servo system involving a self-balancing bridge arrangement. A preferred form of such a system especially adaptable to the purposes of the invention is described in the book "Principles and Methods of Telemetering" by P. A. Borden and G. M. Thynell, (Reinhold Publishing Co., New York, 1948) pages 148, 149.

Referring now to Fig. 3, the numeral 100 designates a combined receiving, recording and synchronizing unit embodying the principles of the invention, and including two shaft members 101 and 102, both journaled for rotation with respect to the base of the instrument. The shaft 101 is provided with a ratchet 103 having teeth to correspond to the number of individual records to be made, or to the number of transmitting instruments to be coordinated in the installation. The shaft 102 is adapted to be driven by an electric motor 104 through a gear reduction 105 at a speed normally identical to that of the shaft 30 in the transmitting terminal unit 10. The shaft 102 carries a cam member or equivalent 106 to operate a pawl member 107 engaging the ratchet 103 to advance the latter, and with it the shaft 101 and elements carried thereby and presently to be described.

Juxtaposed to the shaft 102 are two snap-action contactors 109 and 110 adapted for actuation respectively by cams 111 and 112 carried by said shaft. The contactor 109 is normally open, and the contactor 110 is of the single-pole double-throw class, having two contact members one of which is normally out of, and the other is normally in, electrical engagement with a common contact member movable by the cam member 112. Juxtaposed to the shaft 101 is a snap-action double-throw contactor 113 having two contact members one of which is normally out of, and the other is normally in, electrical engagement with a common contact member movable by a cam member 114 carried by said shaft 101.

While, as hereinbefore pointed out, the recording instrumentality may be of the form shown in said Blakeslee application, it has been found expedient in the interest of simplicity to represent its mechanism more or less diagrammatically. A drum member 115 adapted to be driven at a constant speed by clock or equivalent timing member 116 carries a strip chart 117 adapted to receive recorded markings representing the desired measurements. Juxtaposed to the drum member 115 and to the chart 117 carried thereby is a print-wheel 120 having thereon printing elements in the form of indicia which may be presented to the surface of the chart to impress the desired markings thereon. The print-wheel 120 is slidably mounted upon the shaft 101 and splined thereto whereby angular displacement of said shaft will be positively communicated to said wheel. A translatable carriage 121, adapted to be positioned along a path parallel to the axis of the shaft 101 is mechanically connected to the print-wheel 120 in a manner to impart to it translatory motion without in any way affecting its angular position as derived from the shaft 101. The printing mechanism is diagrammatically illustrated as comprising a striker-bar 125 extended parallel to the path of the carriage 121 and carried by a rod 126 slidably mounted for limited displacement perpendicular to said path to engage mechanism (not shown) of said carriage, whereby to force the print-wheel 120 toward the drum 115 causing one of the indicia carried thereby to engage the surface of the chart imprinting thereon a corresponding identifying mark. The rod 126 engages the face of a cam member 127 carried by the shaft 102, whereby to be actuated once in each revolution of said shaft for the purpose of effecting the printing action.

Mounted within the instrument 100 is an impulse-duration receiving unit 130, preferably of the class shown in said C. W. Bristol Patent No. 2,040,918, and having an operating motor element 130M and an actuating magnet element 130m, and being fitted with a suitable pulley-wheel 131 which, in accordance with the principles of said last-named patent will tend to be positioned by the motor element 130M at an angular displacement representing the relative intervals of energization and de-energization of the magnet 130m. By means of a flexible cord 132 passing about pulleys 133 suitably located and pivoted on the base of the instrument 20, and attached to the carriage 121, the latter is rendered responsive to the receiving unit 130 to be positioned within its range of excursion according to the angular setting of said pulley-wheel. (As previously pointed out, the interconnection between the receiving mechanism 130 and the recording carriage 121 has for simplicity's sake been shown of a mechanical nature, rather than the electrical servo-system which would more probably be employed in practice.)

Included in the receiver-recorder unit 100 are three relays 141, 142 and 143, corresponding respectively to the relays 71, 72 and 73 of Fig. 1. Relay 141 is provided with single-pole normally-closed contacts, while relays 142 and 143 are of the double-pole normally-open form. A diode rectifier 144 is connected across the contacts of relay 141, and a capacitor 145 across the terminals of motor 104. Also included in the unit 100 is a motor-driven time delay switch 146 corresponding in characteristics and function to the switch 76 in Fig. 1.

The electrical connections of the receiving unit 100 are as follows: One terminal of the motor 130M is connected to a conductor 150 forming one side of a suitable source of electric power, and the other terminal of said motor is connected to the normally closed contact of snap-action switch 113. The common contact of said switch is connected to the common contact of switch 110, to the normally closed contact of which is connected a conductor 151 forming the other side of said power source.

One terminal of the receiver magnet 130m is connected by means of a conductor 152 to one side of a battery or other power source 153 suited to operation of said magnet, and the other terminal thereof by means of a conductor 154, in series with one of the two sets of contacts on the relay 143 to a conductor 155, and thence to the other side of said source. The normally open snap-action switch 109 is connected between the conductors 154 and 155 whereby when closed to bridge the said contacts of relay 143. The other set of contacts in relay 143 is connected in series between one terminal of the operating winding of time-delay switch 146 and a conductor 157. The actuating winding of relay 143 is connected, similarly to that of the relay 73 in Fig. 1, in series with a battery 158 or other power source suited to the operation of said relay to the conductors 45 and 46 which together comprise the two-wire circuit 19 interconnecting the transmitting and the receiving stations.

The free terminal of the operating winding of time-delay switch 146, together with one of the contact elements thereof, is connected to the line conductor 150. The other of said contact elements in the time-delay switch is connected to a common terminal of the operating windings of the relays 141 and 142. The free terminal of the winding of relay 142 is connected to the conductor 157, and one set of the normally-open contacts of said relay is in series between said conductor 157 and the line conductor 151. The normally open contact of the cam-actuated switch 110 is connected in series with the other set of contacts in the relay 142 to the free terminal of the actuating winding of relay 141. The normally open contact of the cam-actuated switch 113 is connected to the conductor 157. The normally-closed contacts of the relay 141 (bridged by the rectifier 144) are connected in series between the free terminal of the motor 104 and the line conductor 151.

Conformation of the cams 106, 111 and 112 may be substantially identical to that of the respectively corresponding cams 63, 68 and 70 in Fig. 1. Cam 114, carried by the shaft 101 serves to identify the synchronizing position of the receiving terminal unit, and is conformed to actutae the snap-action switch 113 at a position corresponding to that at which the contact arm 55 in the receiving terminal unit of Fig. 1 engages the contact stud D'. Because all received signals are communicated to a single exhibiting mechanism, the two contact circles which serve to select the motor and the magnet windings of the several receiving instruments in Fig. 1 are eliminated, and have no corresponding elements in the form of the invention shown in Fig. 3.

Operation of the form of apparatus shown in Fig. 3 may now be given consideration. Assuming the interconnecting circuit 19 to be completed between said apparatus and the transmitting terminal unit 10 shown in Fig. 1, the relay 143 will be responsive to signals in said circuit, and will close and open its contacts accordingly.

With the conductors 150 and 151 connected to the power source and with the cams on the shaft 102 in the postions shown in Fig. 3, the relays 141 and 142 will be de-energized, so that the contacts of the former will be closed and those of the latter opened. Thus, the motor 104 will be energized and will operate continuously. Through the closed contacts of switches 110 and 113, potential from the conductors 150—151 will also be impressed upon the terminals of the receiver motor 130M, causing it to operate. The cyclical operation of the relay 143 in response to signals received over the circuit 19 will cause the electromagnet 130m to be correspondingly actuated, with the result that the receiving mechanism 130 of which said last-named motor and magnet form elements will be rendered operative, and will tend to position the pulley wheel 131 at an angular excursion of magnitude corresponding to the quantity being measured by the particular one of the transmitting instruments 11, 12 and 13 which through the contact-arm 25 in the transmitting terminal unit is connected to said circuit. The print-wheel 120, through the connecting cord 132, will thus assume in its range of travel a position corresponding to said quantity, and by its excursion from a predetermined zero of reference will provide a measure corresponding thereto. After the provision of ample time for said print-wheel to assume a significant position along the shaft 101, the cam 112 attains a position (corresponding to c in Fig. 2) where the receiver motor 130M is brought to rest and the receiver 130 rendered inactive. Following this event, the cam 127 actuates the rod 126, causing the striker bar 125 to engage the printing mechanism, bringing the print-wheel 120 into marking engagement with the surface of the chart 117 and imprinting on said chart a mark designating the position of the print-wheel, and therefore representative of the then measured quantity.

Immediately after the printing operation, and at a point in the cycle corresponding to a in Fig. 2, the contacts of switch 37 in the transmitting terminal unit are opened as previously described, and the ratchet wheel 28 activated by the cam 33 to advance the contact arm 25 to the stud corresponding to the next in sequence of the transmitting instruments. Under conditions of synchronism between the respective terminal units, the ratchet 103 in the receiving unit 100 will at the same moment be activated by the cam 106 and will advance the shaft 101 to its next position, at the same time rotating the print-wheel 120 to present to the chart 117 a marking member different from that characterizing the previously imprinted record.

The "pulsing" cam 111 functions in a manner identical to that of the corresponding cam 68 in Fig. 1, to energize momentarily, and release, the electromagnet 130m, allowing the dogs or impellers in the receiving mechanism to reset to their respective zeros, thus eliminating any residual displacements which might falsify succeeding readings of the instrument.

Advancing of the transmitting and the receiving terminal units, positioning of the print-wheel, and recording of its position, will continue to be repeated until the mechanism in the latter unit attains a position where the cam 114 on the shaft 101 actuates the snap-action switch 113 in a sense to open its normally-closed, and close its normally-open, contacts. Because advances of the shaft 101 take place only during those intervals when the switch 110 is also in the position where its normally closed contacts are open, and vice versa, the only immediate result of the operation of switch 113 is to provide a connection between the conductor 157 and the common contact of switch 110. As the shaft 101 is brought to rest in this, the "synchronizing," position the normally-closed contact of switch 110 is re-engaged with the common contact, whereby conductor 157 becomes for the time connected to the line conductor 151. The relay 142 is thereby immediately energized, closing its two sets of normally open contacts, one set of which provides a circuit for locking in said relay and also for energizing the motor of time-delay switch 146 upon energization of the relay 143, and the other set of contacts providing an electrical connection between the free end of the winding of relay 141 and the normally open contact of snap-action switch 110. With the normally closed contact of switch 113 in an open position, the motor 130M wil be de-energized, and the receiving mechanism 130 rendered inoperative.

Upon cam-shaft 102 attaining an angular position corresponding to the termination of the normal measuring period, cam 112 will operate the switch 110, completing through its now closed contacts, the contacts of relay 142, the winding of relay 141 and the contacts of time-delay switch 146, a circuit from the conductor 151 to the conductor 150. Thus the relay 141 will be energized and will open its contacts, thereby interrupting the supply of alternating current to the motor 104 and causing it to be brought abruptly to rest, as set forth in the explanation of the performance of motor 61 in Fig. 1. The motor 104, and mechanism driven thereby are thus brought to rest in a predetermined position corresponding to that which they should occupy at the termination of the synchronizing interval.

Immediately after the contact arm 25 in the transmitting unit comes to rest on the stud D the switch 37 will be closed, completing the circuit through the interconnecting line 19 and energizing the relay 143 in the receiving terminal unit 100. Because of the interconnection of conductors 157 and 151 through the switches 110 and 113, closing of the contacts of the relay 143 will now provide a circuit for the motor of time-delay switch 146, initiating the characteristic delay interval of the same. As the time-delay switch completes its cycle it opens its contacts, de-energizing relays 141 and 142, restarting the motor 104, and allowing the associated circuits to revert to their normal condition. During the synchronizing interval the cam 127 carried by the shaft 102 will pass through the position where it actuates the printing mechanism, and the print-wheel will be presented to the chart 117 to impress a mark thereon. As the transmitting terminal unit will not at that time be providing connection of the circuit 19 to any of the transmitting instruments, and as operation of the receiving mechanism 130 will be inhibited, the position of the print-wheel within its range will have no quantitative significance. For this position of the print-wheel, therefore, the indicia may be omitted, leaving a corresponding blank on the record.

The foregoing description of telemetering and multiplexing apparatus incorporating the principle of the invention has been based on the use of alternating-current motors for driving the selector switches in the transmitting and the receiving terminal units, and on the use of an interconnecting channel in the form of a two-conductor metallic circuit carrying signals of the nature of periodically keyed direct current pulses of constant amplitude. It will be apparent however, that the system is in no way restricted to the utilization of either of these kinds of current. No invention would be involved in substituting direct-current motors for either or both of the motor units 31 and 61 in Fig. 1, provided the braking means comprising the rectifier 74 and capacitor 75 in the receiving terminal unit were replaced, as suggested, by dynamic braking apparatus or some other device known in the art, whereby to confer upon such a motor the critical performance set forth as desirable.

It will be apparent, moreover, referring again to Fig. 1, that the only limitation upon the kind of current comprising the electrical signal transmitted to the receiving terminal unit is that the relay 73 shall be responsive thereto. Direct current in a metallic circuit has been selected solely as a practicable and convenient example. It is equally efficacious to utilize alternating current of conventional power frequency, provided the time of one cycle thereof be a negligible part of the duration of the minimum signal which may be employed. Utilization of the transmitting instruments to key a carrier, a conventional radio signal, or a microwave signal is well known in the art, as is also the procedure of reconverting such a signal to an electrical magnitude adapted to the operation of an electromechanical relay corresponding to the relay 73 in Fig. 1. The general techniques of the utilization of such channels are discussed in Chapters 9 and 10 of the hereinbefore mentioned book "Principles and Methods of Telemetering." It is also within the scope of the disclosure that the D.-C. sources 85 and 86 of Fig. 1 be combined, and that, without in any way departing from the spirit of the invention, the electromagnets 21m, 22m, etc., and the relay 73, be operated from a common source of electrical energy.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted in each cycle of operation thereof to assume positions to connect successively said transmitting instruments operatively to said channel to control signals therein, second selector means at the receiving terminus of said channel in each cycle of operation thereof and adapted to assume positions to render said exhibiting means successively responsive to signals controlled by the respective transmitting instruments, means for advancing said first selector means periodically from position to position, means for normally advancing said second selector means periodically from position to position in step with said first selector means, and means for establishing and maintaining synchronism between said respective advancing means and comprising at the transmitting terminus means adapted during a predetermined portion of said cycles to impress upon said channel a fixed-interval electrical signal differing only in duration from said timed signals, and at the receiving terminus means responsive only to said fixed-interval signals solely during said predetermined portion of said cycles to affect the time of advance of said second selector means.

2. In a telemetering system as set forth in claim 1 wherein said means for normally advancing said second selector means periodically from position to position in step with said first selector means is operable independently of said first selector means.

3. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, said receiving means including an exhibiting member and motor means adapted to position the same and electromagnet means adapted to control the positioning influence of said motor means in response to electrical signals impressed thereon, and a circuit for impressing timed electrical signals upon said electromagnet means, a single interconnecting channel adapted to convey said timed electrical signals to said circuit to energize said electromagnet means and forming the sole means of communication between said transmitting instruments and said exhibiting means, first selector means at the transmitting terminus of said channel and adapted to assume positions to connect successively said transmitting instruments operatively to said channel to control signals therein, second selector means at the receiving terminus of said channel and adapted to assume positions whereby to identify the performance of said exhibiting means with individual transmitting instruments, means for advancing said first selector means periodically from position to position, means for normally advancing said second selector means periodically from position to position in step with said first selector means, means operative incidentally to each advance of said second selector means momentarily to complete said circuit whereby correspondingly to energize said electromagnet means, and means for establishing and maintaining synchronism between said respective advancing means and comprising at the transmitting terminus of said channel means adapted upon arrival of said first selector means at a predetermined position to impress upon said channel a fixed interval electrical signal differing only in duration from said timed signals, and at the receiving terminus means responsive only to said fixed interval signals when said selector means is at a position corresponding to said predetermined position to affect the time of advance of said second selector means.

4. In a telemetering system, the combination of a plurality of transmitting instruments each adapted to control the timing of electrical signals in correspondence with the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted to assume positions to connect successively said transmitting instruments operatively to said channel to control signals therein, second selector means at the receiving terminus of said channel and adapted to assume positions to render said exhibiting means successively responsive to signals controlled by the respective transmitting instruments, means for advancing said first selector means periodically from position to position, means for normally advancing said second selector means periodically from position to position in step with said first selector means, means for establishing and maintaining synchronism between said respective advancing means and comprising at the transmitting terminus means adapted upon arrival of said first selector means at a predetermined position to impress upon said channel a fixed-interval electrical signal differing only in duration from said timed signals, and at the receiving terminus means responsive only to said fixed-interval signals when said second selector means is at a position corresponding to said predetermined position to affect the time of advance of said second selector means, auxiliary contact means in circuit with the respective selector means, and means cooperating with said auxiliary contact means for maintaining said selector means in a non-current-carrying condition while being advanced from position to position.

5. In a telemetering system, the combination of a plurality of transmitting instruments each adapted to control the timing of electrical signals in correspondence with the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted to assume positions to connect successively said transmitting instruments operatively to said channel to control signals therein, second selector means at the receiving terminus of said channel and adapted to assume positions to render said exhibiting means successively responsive to signals controlled by the respective transmitting instruments, means for advancing said first selector means periodically from position to position, means for normally advancing said second selector means periodically from position to position in step with said first selector means, means for establishing and maintaining synchronism between said respective advancing means and comprising at the transmitting terminus means adapted upon arrival of said first selector means at a predetermined position to impress upon said channel a fixed-interval electrical signal differing only in duration from said timed signals, and at the receiving terminus means responsive only to said fixed-interval signals when said second selector means is at a position corresponding to said predetermined position to affect the time of advance of said second selector means, auxiliary contact means in circuit with the respective selector means, and means cooperating with said auxiliary contact means for maintaining said selector means in open-circuit status while being advanced from position to position.

6. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted in repetitive cycles to assume positions to connect successively said transmitting instruments operatively to said channel to control signals therein, second selector means at the receiving terminus of said channel and adapted in repetitive cycles to assume positions whereby to identify the performance of said exhibiting means with the respective transmitting instruments, means for advancing said first selector means periodically from position to position, means for normally advancing said second selector means periodically from position to position in step with said first selector means, means operable in each cycle of operation of said first selector means to introduce a definite delay interval in the advance thereof and thereafter to impress upon said channel a fixed-interval electrical signal differing only in duration from said timed signals, means subject to actuation in each cycle of operation of said second selector means to bring the same to rest at a predetermined position in its cycle, and timing means activated by the initiation of said fixed-interval signal and adapted to restart said second selector means after the lapse of a predetermined time interval.

7. In a telemetering system, the combination of a plurality of transmitting instruments each adapted to control the timing of electrical signals in correspondence to the values of a measured quantity, a plurality of receiving instruments adapted to be responsive to said timed signals to effect exhibitions of said values, a single inter-connecting channel forming the sole means of communication between said transmitting and said receiving instruments, first selector means at the transmitting terminus of said channel and adapted to assume positions to connect successively said transmitting instruments operatively to said channel to control signals therein, second selector means at the receiving terminus of said channel and adapted to assume positions to connect successively said receiving instruments to said channel to be responsive to said signals, means for advancing said first selector means periodically from position to position, means for normally advancing said second selector means periodically from position to position; in step with said first selector means, and means for establishing and maintaining synchronism between said respective advancing means and comprising at the transmitting terminus means adapted upon arrival of said first selector means at a predetermined position to impress upon said channel a fixed-interval electrical signal differing only in duration from said timed signals and at the receiving terminus means responsive only to said fixed-interval signals when said second selector means is at a position corresponding to said predetermined position to affect the time of advance of said second selector means.

8. In a telemetering system, the combination of a plurality of transmitting instruments each adapted to control the timing of electrical signals in correspondence to values of a measured quantity, a multiple-point recording instrument having a chart and recording means adapted to mark thereon a plurality of discrete records and including an impulse-responsive member adapted to position said recording means in accordance with timed electrical signals, a single interconnecting channel forming the sole means of communication between said transmitting instruments and said recording instrument, first selector means at the transmitting terminus of said channel and adapted to assume positions to connect successively said transmitting instruments operatively to said channel to control signals therein, second selector means at the receiving terminus of said channel and adapted to assume positions whereby successively to confer upon said recording means characteristic indicia corresponding to individual transmitting instruments connected to said channel and thus to identify respective records on said chart, means for advancing said first selector means periodically from position to position, means for advancing said second selector means periodically from position to position, means for establishing and maintaining synchronism between said respective advancing means and comprising at the transmitting terminus means adapted periodically to impress upon said channel a fixed-interval electrical signal differing only in duration from said timed signals and at the receiving terminus means responsive only to said fixed-interval signals to affect the time of advance of said second selector means.

9. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said receiving means, first selector means at the transmitting terminus of said channel and comprising a multiple-position switch having means for periodically advancing the same from position to position in repetitive cycles and including a plurality of contact points and a contact member cooperating therewith in said positions to provide connection successively between said points and said channel, certain of said points being operatively connected to said transmitting instruments whereby to render the timing of electrical signals in said channel subject respectively to said transmitting instruments, and one of said points being connected to said channel independently of any transmitting instrument whereby once in each of said cycles to establish in said channel a signal of fixed duration independent of any of said instruments, second selector means at the receiving terminus of said channel and adapted to assume positions to render said exhibiting means individually and successively responsive to said timed signals, means for periodically advancing said selector means normally in step from position to position, and further means responsive only to said signals of independent duration when said second selector means is in a position corresponding to said one point to affect the time of advance of said second selector means.

10. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said receiving means, first selector means at the transmitting terminus of said channel and comprising a multiple-position switch having means for periodically advancing the same from position to position in repetitive cycles and including a plurality of contact points and a contact member cooperating therewith in said positions to provide connection successively between said points and said channel, certain of said points being operatively connected to said transmitting instruments whereby to render the timing of electrical signals in said channel subject respectively to said transmitting instruments, and one of said points being connected to said channel independently of any transmitting instrument whereby once in each of said cycles to establish in said channel a signal of fixed duration independent of any of said instruments, second selector means at the receiving terminus of said channel and adapted to assume positions to render said exhibiting means individually and successively responsive to said timed signals, means for periodically advancing said selector means normally in step from position to position, and further means included in said second selector means and responsive only to said signals of independent duration at a selected one of said positions thereof to affect the time of advance of said second selector means from said position to the succeeding position.

11. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted to assume positions to connect successively said transmitting instruments operatively to said channel to control signals therein and upon arrival at a predetermined position to impress upon said channel a signal of predetermined and fixed interval differing only in duration from said controlled signals, second selector means at the receiving terminus of said channel and comprising a multiple-position switch including a plurality of contact points and means for periodically advancing said switch from position to position in repetitive cycles normally in step with said first selector means, and including also a timing device, certain of said points being connected to said receiving means to render the same responsive to said controlled electrical signals, and one of said points having electrical connection to said advancing means and to said timing device whereby upon reception of said fixed interval signal when said switch engages said one point to superimpose upon the normal cycle of said advancing means a time element determined by said device.

12. Telemetric apparatus comprising a plurality of transmitting instruments each adapted to send impulses of durations corresponding to values of variable magnitudes, selector means comprising a multiple-position switch having means for periodically advancing the same from position to position in repetitive cycles and including a plurality of contact points and a contact member cooperating therewith in said positions to provide connection between said points and a telemetering channel, certain of said points being operatively connected to said transmitting instruments whereby to connect the latter successively to said channel, and means connected to another of said points for applying to said channel once in each of said cycles an impulse of fixed duration greater than the durations of the impulses from any of said instruments.

13. Telemetric apparatus comprising a plurality of transmitting instruments each adapted to send impulses of durations corresponding to values of variable magnitudes, means for connecting said instruments successively to a telemetering channel in each of repetitive cycles, and means controlled by the first mentioned means for applying to said channel once in each of said cycles an impulse of fixed duration distinguishable from the impulses from said transmitting instruments and of the same polarity.

14. Telemetric receiver apparatus comprising means for producing mutually distinct exhibitions of values of different variable magnitudes in response to impulses received from a plurality of independent transmitters, selector means adapted to assume positions to render said exhibiting means successively operative to impulses from the respective transmitters, means for advancing said selector means periodically from position to position, means responsive to an impulse differing only in duration from the first-mentioned impulses for affecting the time of advance from a reference position of said selector means, and means for rendering said exhibiting means insensitive to impulses other than those originating in said transmitters.

15. Telemetric apparatus comprising a plurality of transmitting instruments each adapted to send impulses of durations corresponding to values of variable magnitudes, selector means for connecting said instruments successively to a telemetering channel in each of repetitive cycles, means operable at a point in each cycle for introducing a delay in the operation of said selector means, and means operable at another point in said cycle for impressing upon said channel an impulse differing only in duration from the first mentioned impulses.

16. Telemetric apparatus comprising a plurality of transmitting instruments each adapted to send impulses of durations corresponding to values of variable magnitudes, motor means, selector means operable by said motor means to connect said instruments successively to a telemetering channel in each repetitive cycle, means operable at a point in each cycle for deenergizing said motor and subsequently reenergizing the same to introduce a delay in the operation of said selector means, and means operable at another point in said cycle for impressing upon said channel an impulse differing only in duration from the first mentioned impulses.

17. In a telemetering system, the combination of a plurality of transmitting instruments each adapted to control the timing of electrical signals in correspondence to the values of a measured quantity, receiving means to provide mutually distinct exhibitions of the quantities measured by the respective transmitting instruments, a single interconnecting channel forming the sole means of communication between said transmitting instruments and said exhibiting means, first selector means at the transmitting terminus of said channel and adapted to assume positions to connect successively said transmitting instruments operatively to said channel to control signals therein, second selector means at the receiving terminus of said channel and adapted to assume positions to render said exhibiting means successively responsive to signals controlled by the respective transmitting instruments, means for advancing said first selector means periodically from position to position, means for normally advancing said second selector means periodically from position to position in step with said first selector means, and means for establishing and maintaining synchronism between said respective advancing means and comprising at the transmitting terminus means adapted periodically to delay the operation of said first transmitting means and thereafter to impress upon said channel a characteristic electrical signal, and at the receiving terminus means responsive only to said characteristic signal to effect the time of advance of said selector means.

References Cited in the file of this patent

UNITED STATES PATENTS

| | | |
|---|---|---|
| 853,888 | Leake | May 14, 1907 |
| 2,466,803 | Giffen et al. | Apr. 12, 1949 |
| 2,586,427 | Hagenau | Feb. 19, 1952 |
| 2,627,063 | Richards | Jan. 27, 1953 |